A. J. FISHER.
GEARING FOR WASHING MACHINES AND THE LIKE.
APPLICATION FILED JUNE 8, 1914.

1,181,379.

Patented May 2, 1916.
5 SHEETS—SHEET 1.

Fig.1.

Witnesses:
Inventor
Alva J. Fisher
By Rector, Skibben, Davis & Macauley
His Attys.

UNITED STATES PATENT OFFICE.

ALVA J. FISHER, OF EVANSTON, ILLINOIS, ASSIGNOR TO HURLEY MACHINE COMPANY, OF CHICAGO, ILLINOIS, A CORPORATION OF ILLINOIS.

GEARING FOR WASHING-MACHINES AND THE LIKE.

1,181,379.

Specification of Letters Patent.

Patented May 2, 1916.

Application filed June 8, 1914. Serial No. 843,780.

*To all whom it may concern:*

Be it known that I, ALVA J. FISHER, a citizen of the United States, residing at Evanston, in the county of Cook and State of Illinois, have invented certain new and useful Improvements in Gearing for Washing-Machines and the like, of which the following is a specification.

My invention relates to gearing for washing machines and the main object thereof is to provide a simple and efficient reversing mechanism for automatically reversing the direction of rotation of the cylinder or operating mechanism within the tub or receptacle of the washing machine.

Another object of my invention is to provide a simple and efficient means for manually changing the direction of rotation of the wringer which is operated from the same prime mover as the washing machine itself.

The various features of novelty and utility of my machine will be apparent from the description hereinafter given.

Referring to the embodiment of my invention as herein shown, the machine comprises a receptacle or tub 1 of suitable shape and dimensions and supported in suitable manner as by means of the series of uprights or standards 2 and the cross-piece 3. The machine further comprises the wringer A suitably supported on one end of the receptacle, a motor such as the electric motor 4 supported on the cross-piece 3, and the driving connections hereinafter described, between the motor and the reversing mechanism and thence to the rotatable cylinder 5 in the receptacle 1 and to the reversing mechanism for the wringer and thence extending to the wringer itself. The motor drives a shaft $4^a$ which may be the armature shaft extended and also drives what I will term a driving shaft 6 through the medium of the shaft 7 and the couplings 8—8, Fig. 1. The driven shaft extends into and has its bearing in a casing 9 provided with a plate 10 whereby such casing may be fixed to the frame of the machine in suitable manner as by means of the bolts 11. To the inner end of this driving shaft 6 is secured a pinion 12 meshing with a large gear 13 having a central shaft or bearing axis 14 journaled in the casing. To this shaft is secured a bevel pinion 15 which meshes with the large bevel gear 16 secured to the inclined driven shaft 17 which is journaled in the casing 9 and is surrounded or sheathed by the concentric stationary tube 18 fitting at its lower end over the tubular extension 19 of the bearing 20 for the shaft 17 and at its upper end fitting into the counter-sunk bearing 21 of the casing of the reversing mechanism hereinafter described, Figs. 3 and 7. The driven shaft 17 also carries near its lower end and above the bevel gear 16 another bevel gear 22 adapted to mesh with a similar bevel gear 23 secured to the lower end of the substantially vertical driven shaft 24 which operates the wringer. The pinion 23 has an extended hub $23^a$ journaled in the bearing 25 in the casing and the shaft 24 is surrounded or sheathed by the stationary tube 26 in substantially the same manner as the other shaft 17. The connections between the driven shaft 24 and the wringer will be hereinafter described.

Figure 1:
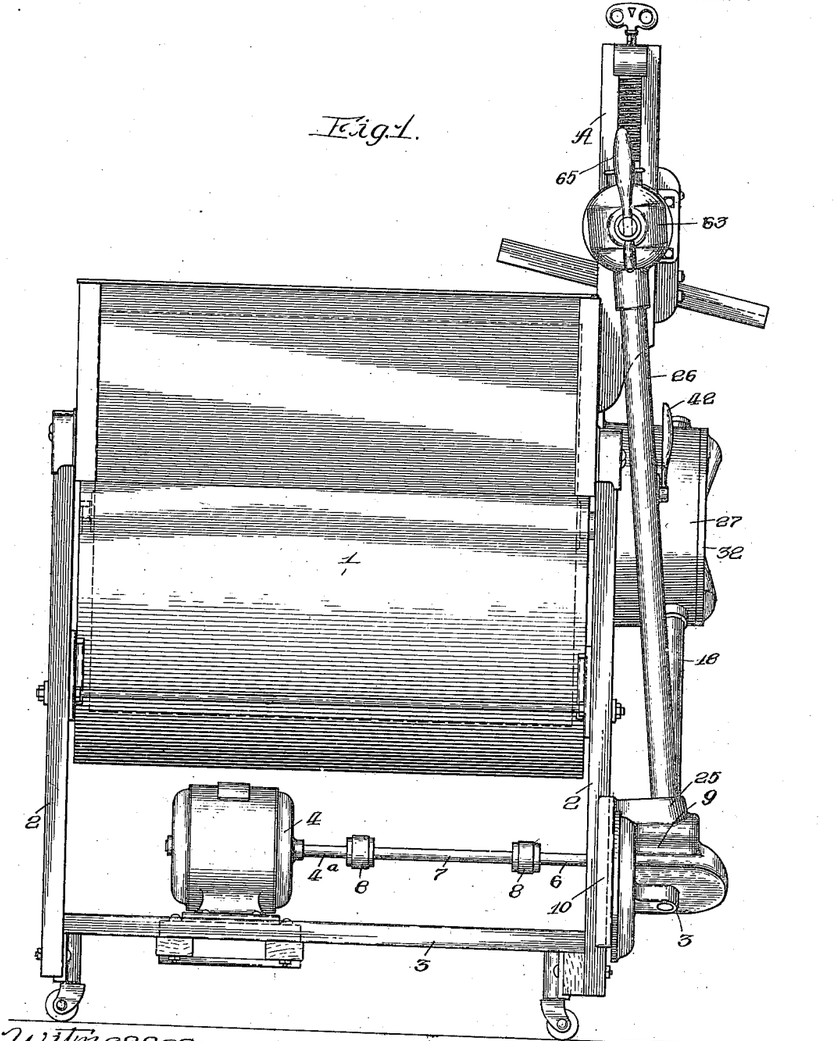
Figure 1 is a side elevation of my washing machine and wringer embodying the operating mechanism constituting my invention.
Figure 2:
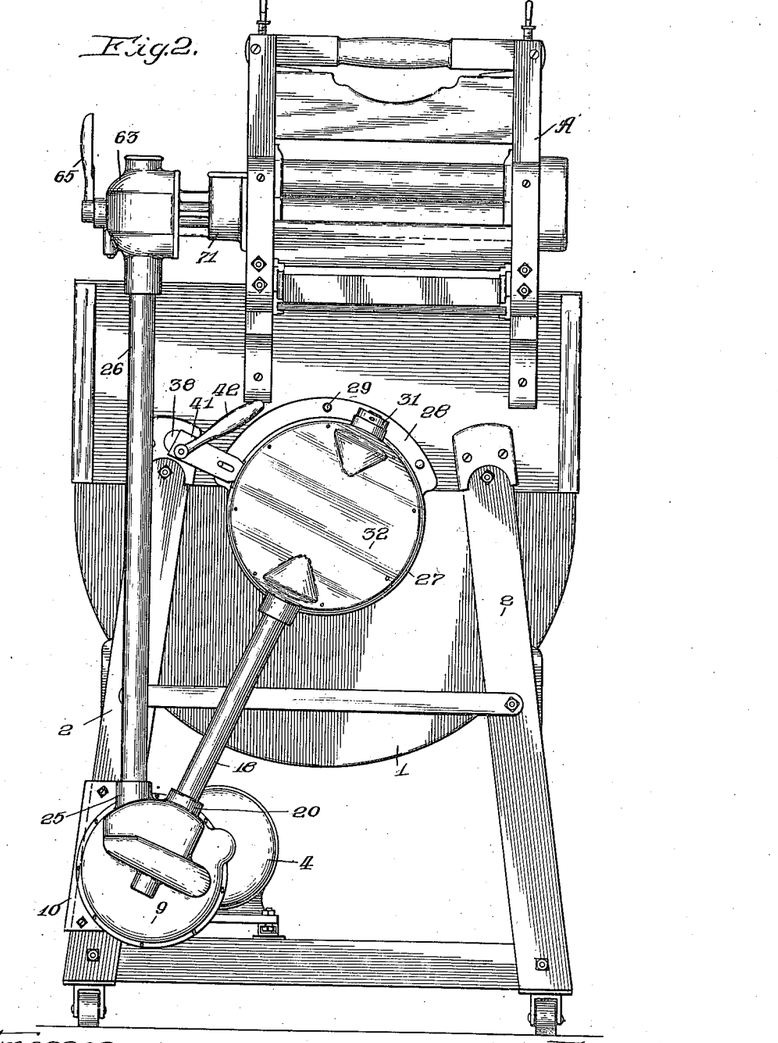
Fig. 2 is an end elevation thereof.
Figures 7, 11:
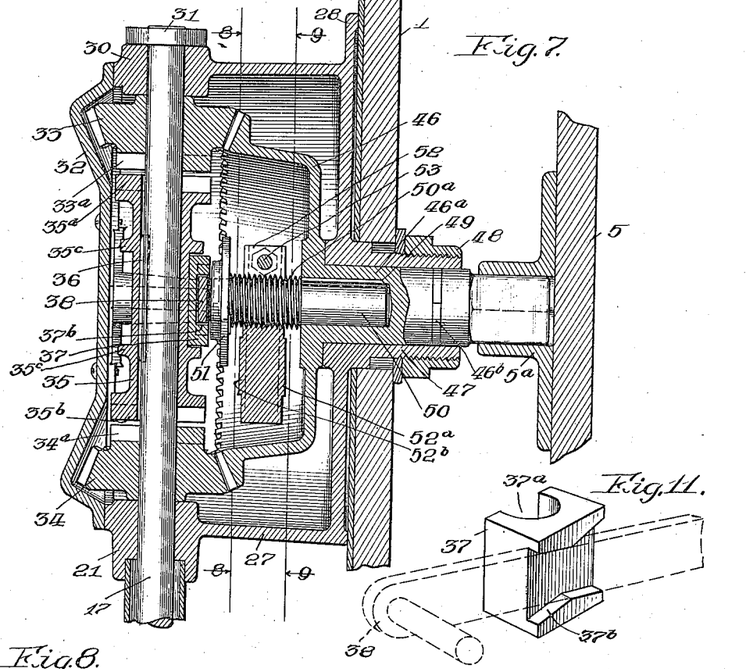
Fig. 7 a section on the line 7—7 of Fig. 5.
Fig. 11 a detail view of the shifting block.
Figure 8:
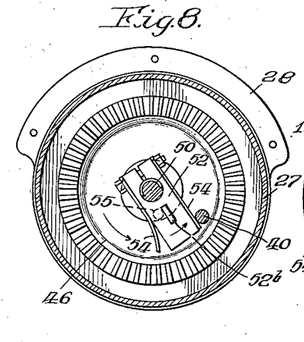
Figs. 8 and 9 sections on the line 8—8 and 9—9 respectively of Fig. 7.
Figure 9:
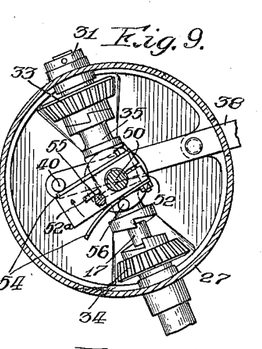

Referring to the automatic reversing mechanism between the driven shaft 17 and the cylinder or agitator 5, said shaft extends upwardly through a casing 27 which is secured to one end of the receptacle in suitable manner as by means of the flange 28 and the bolts 29, Figs. 1, 2 and 7. This shaft is journaled in the lower bearing 21 and an upper bearing 30 at the top of the casing and is held in place in suitable manner as by means of the collar 31 secured to its upper end. The casing incloses all of the operating parts of the reversing mechanism and for the purpose of assembling the parts and to enable easy inspection the casing is provided with a removable front plate 32.

Figures 5, 6, 12, 13:
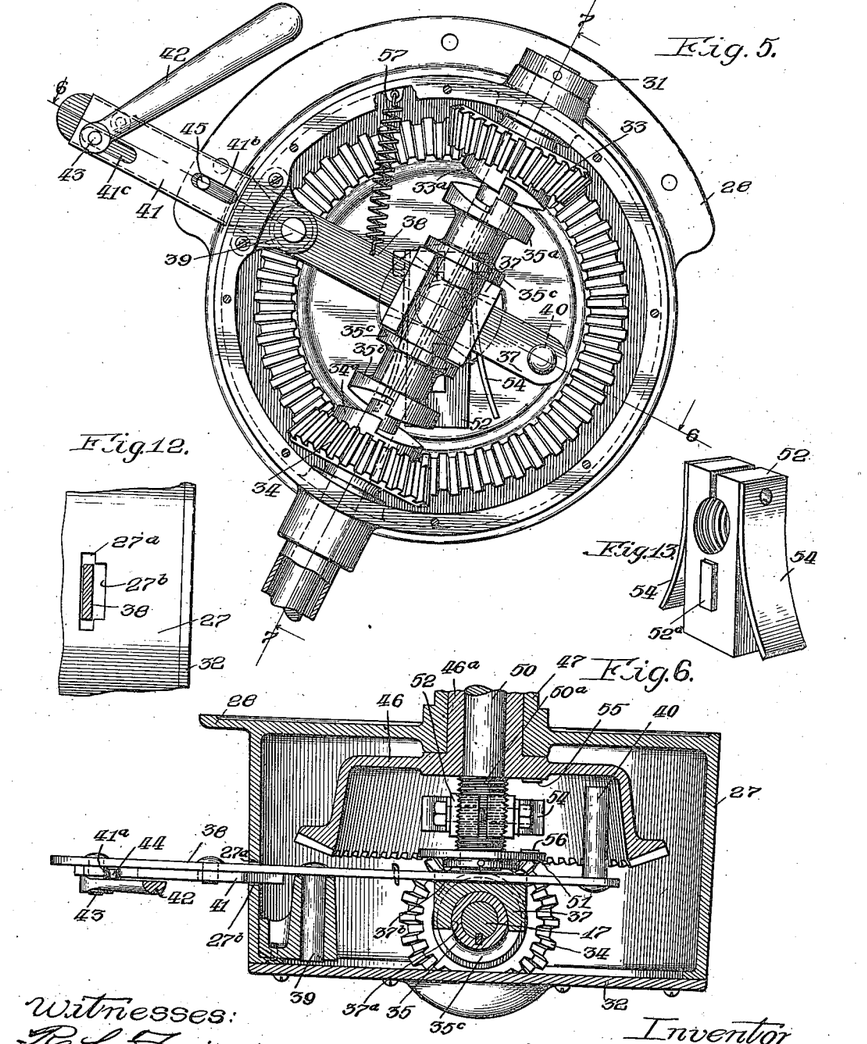
Fig. 5 an elevation of the reversing mechanism, the cover of its casing being removed.
Fig 6 a section on the line 6—6 of Fig. 5.
Fig. 12 a detail view of a part of the casing of the reversing mechanism.
Fig. 13 a detail view of the weighted nut.

Upon the driven shaft 17 are loosely mounted the upper and lower bevel pinions 33 and 34 and intermediate these pinions there is mounted upon this shaft a longitudinally-movable shiftable clutch sleeve 35 which in connection with the clutch faces, hereinafter described, on the inner adjacent faces of the pinions 33 and 34 constitute clutches for the purpose of transmitting the motion between the driven shaft 17 and one or the other of these two pinions. This clutch sleeve is keyed to the shaft by means of the longitudinal key 36 with the result that such sleeve is rotated by the shaft 17 but has a longitudinal movement thereon. As shown more clearly in Fig. 5 the upper pinion 33 has a clutch face $33^a$ on its inner hub portion and the other pinion 34 has a similar clutch face $34^a$. The ends of the clutch sleeve have similar or companion clutch faces, the upper end of such sleeve having a clutch face $35^a$ and the lower end a clutch face $35^b$. The sleeve is provided toward its central portion with two annular shoulders or collars $35^c$ either separate from or integral with the sleeve. Between these two shoulders is arranged a shifting block 37 shown in detail in Fig. 11, the same having a longitudinal bearing opening $37^a$ slightly more than a semi-circle and adapted to fit upon the shaft 17, as seen in Fig. 6. The shifting block 37 is adapted to be moved or shifted in a direction longitudinal of the shaft 17 by means of the lever 38 which is pivoted intermediate its length upon the pin or stud 39 supported in the casing 27, Fig. 6. The inner portion of this lever engages with the side recess $37^b$ of the block as seen in Fig. 11, such recess being of the irregular shape shown in order to accommodate the relative movements of the lever and block. The inner end of the lever carries an inwardly-projecting pin 40 having the function hereinafter explained. The lever extends through an opening $27^a$ in the casing which opening is in the form of a slot to permit of the rocking movements of the lever. Upon one side of the lever is a sliding plate 41 which is adapted to be projected into the smaller opening $27^b$ at one side of the slot by means of the handle lever 42 when it is desired to lock the shifting sleeve 35 in its intermediate or neutral position as shown in Fig. 5. This lever is pivoted at 43 upon one side of the lever 38 and is operatively connected with the sliding plate 41 by means of its stud 44 engaging an opening $41^a$ in such plate. This plate has a slot $41^b$ coöperating with a stud 45 on one side of the lever 38 and also has another slot $41^c$ on which the handle is mounted, with the result that by the rocking of the handle 42 the plate 41 may be projected into the slot $27^b$ to lock the lever 38 in such neutral position as seen in Fig. 5 or may be rocked to the opposite position for withdrawing such plate from its locking position. The inner end of this locking plate is beveled so that if the lever 38 is in either one of its operating positions it may be withdrawn therefrom by the act of rocking the handle 42, one of the bevel sides of the plate engaging one edge of the slot $27^b$ and thereby forcibly withdrawing the lever from its operative to its neutral position when the handle 42 is rocked to the position shown in Fig. 5.

Both of the pinions 33 and 34 are in constant mesh with the drum-shaped bevel gear 46 whose hub $46^a$ is journaled in the bearing 47 provided in the casing 27. This bearing extends through an end wall of the receptacle 1 and is held thereto by means of the nut 48 screwing on the inner end of such extended bearing, a gasket 49 being interposed between the nut and the wall of the receptacle. These means constitute a fastening additional to the bolts 29 for securing the casing 27 to the receptacle 1. The inner end of the hub $46^a$ is angular for operative connection with hub $5^a$ of the cylinder or agitator within the receptacle. The outer portion of the hub $46^a$ has a central bore in which is secured and keyed by means of the key 49 a shaft or bolt 50 having a screw-threaded portion $50^a$ and having secured to its outer end a disk 51. This screw-threaded portion receives a nut 52 which is provided with a depending portion in order that such nut may be weighted and thereby ordinarily prevented from rotating but compelled to travel longitudinally with respect to the longitudinal axis of the bolt 50. By preference this nut is split at its upper end and such split ends are held by a cross bolt 53, whereby the proper fit between the nut and the screw threads may be obtained and any wear taken up. Also by preference the sides of the nut are provided with cushioning means for a purpose hereinafter explained, such means comprising the two similar flat springs 54 secured at their upper ends by the bolt 53 and having their lower ends bent outwardly, Figs. 5, 8, 9 and 10.

When the parts are in the position shown in Figs. 5 and 7 the sleeve 35 is in neutral position so that the motion of the shaft 17 will not be communicated further than this sleeve, that is to say the pinions 33 and 34 will not be rotated and consequently the cylinder 5 will not be operated because at this time the sleeve is not in clutching engagement with either one of said two pinions.

Figure 10:
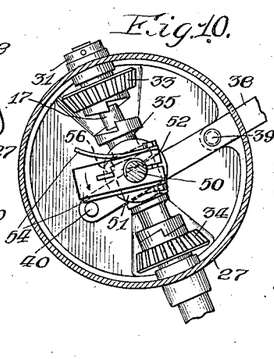
Fig. 10 a view similar to Fig. 9 but showing a different position of the parts.

However, assuming that the sleeve is now shifted downwardly by hand through the medium of the lever 38 so that its clutch face 35$^b$ will engage the clutch face 34$^a$ of the lower pinion 34, as shown in Fig. 10, the rotation of the shaft 17 will be communicated to the pinion 34 and therefrom to the gear 46 and finally to the cylinder 5. The rotation of the gear 46 means a similar rotation of the bolt or shaft 50 and consequently the nut 52 will move longitudinally of such bolt in a direction depending upon the direction of the thread thereon and also of course depending upon the direction of rotation of the bolt itself. Assuming that in the present instance the nut is moved toward the right when viewed as in Fig. 7 it will move until its right-hand side rib 52$^a$ comes into contact with the projection 55 on one face of the gear wheel 46 adjacent its hub portion, Figs. 6 and 8 whereupon such nut will partake of the rotary movement of its bolt and the gear wheel 46. The nut in its rotation will strike the pin 40 and thereby inclose the lever 38 and consequently shift the sleeve 35 to its upper position shown in Fig. 9 the clutch between it and the lower pinion 34 and engaging the clutch between it and the upper pinion 33. Consequently the pinion 33 will become the driving pinion and as it is located diametrically opposite the pinion 34 with respect to the gear 46, it follows that this latter gear will be rotated in the opposite direction. In this rotation of the gear 46 and the bolt 50 in the reverse direction the nut 52 will move longitudinally to the left, Fig. 7, and the rib 52$^b$ on its left-hand side will eventually come into contact with the projection 56 on the inner face of the disk 51 with the result that the nut will be caused to rotate with its bolt. In this rotation the nut will come in contact with the pin 40 and will rock the lever 38 in the opposite direction thereby unclutching the sleeve from the upper pinion 33 and puting it into clutching engagement with the lower pinion 34 and consequently reversing the direction of rotation of the gear 46. The springs 54 serve as cushioning springs for cushioning the contact between the nut and the stud or pin 40. By preference the lever is provided with a spring 57 tending to hold the same to a neutral position but the same is not essential and may be dispensed with.

By the means above described the rotation of the agitating device within the receptacle is automatically reversed by simple and efficient mechanism. The duration of the periods of operation in one direction and the other can be very readily adjusted in different ways, as for instance by increasing or decreasing the length of the threaded portion of the bolt 50 or by increasing the extent of projection of the projections 55 and 56 or by changing the pitch of the screw threads because of a faster or slower movement of the nut.

Figures 3, 4, 14:
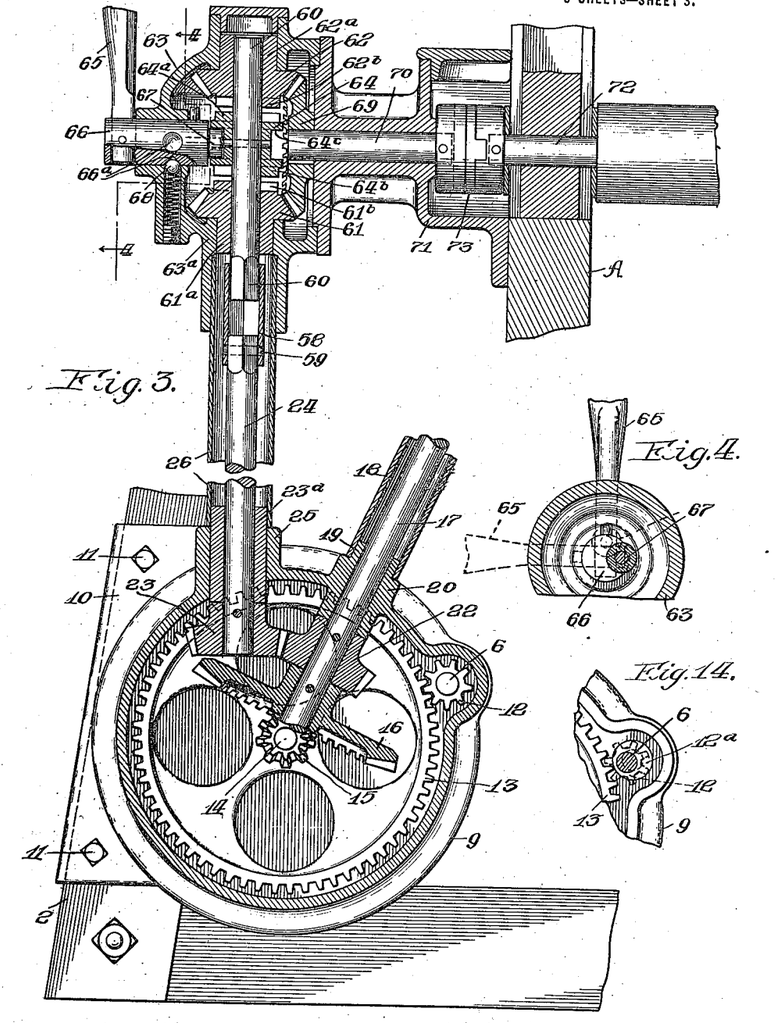
Fig. 3 a section on the line 3—3 of Fig. 1 but on a larger scale.
Fig. 4 a section on the line 4—4 of Fig. 3.
Fig. 14 a detail view of pinion 6 and its bushing.

Referring to the operating connections between the other driven shaft 24 and the wringer, reference is had to Figs. 1 to 4. The upper end of the shaft 24 is made angular to receive an angular-shaped tube or sleeve 58 which is preferably pinned thereto by the pin 59. The upper end of this sleeve receives the lower angular end of a short driven shaft 60 which has its bearings in the hubs 61$^a$ and 62$^a$ of two similar bevel gears 61 and 62 respectively which are loosely mounted on said shaft 60. These two hubs are journaled in the bearings 63$^a$ of a suitable casing 63 which houses said gearing. On the shaft 60 intermediate the two pinions is mounted a clutch sleeve 64 which has an upper clutch face 64$^a$ and a lower clutch face 64$^b$, the former being adapted to engage with a corresponding clutch face 62$^b$ on the pinion 62 and the latter with a corresponding clutch face 61$^b$ on the lower pinion 61. This clutch sleeve is operated by the handle 65 which is connected to a rocking cylinder 66 on whose inner end is mounted a roller 67 arranged eccentric of the longitudinal axis of the cylinder which axis intersects the central longitudinal axis of the shaft 60. This roller engages in an opening 64$^c$ in one side of the sleeve 64 with the result that the rocking of the handle 65 will cause the sleeve to be raised or lowered to one or the other of its operative positions. In Fig. 3 the handle and sleeve are shown in their neutral position but when the handle is turned to the dotted line position shown in Fig. 3 the sleeve will be raised so that the rotation of the shafts 24 and 60 will be communicated to the pinion 62, it being understood that the sleeve is keyed to the shaft 60 so as to be rotated thereby and to also have a longitudinal movement thereon. When the handle 65 is rocked down to its right-hand position, Fig. 4, the sleeve will be brought into clutching engagement with the lower pinion 61. The different positions of the handle 65 are determined and maintained separate as against positive force by the spring-pressed ball 68 adapted to engage in any one of the several holes 66$^a$ which determine the three positions named. The two pinions 61 and 62 are in constant mesh with a third bevel pinion 69 which is secured to the outer end of the horizontal shaft 70 bearing in the bracket casing 71 secured to one side of the wringer. The shaft 70 is connected with the shaft 72 of the wringer roller by means of a suitable coupling such as the coupling 73. It will be understood from the foregoing description that when the sleeve 64 is in clutching engagement with one of the pinions 64 or 62 it will drive the wringer in one direction and when in engagement with the other pinion it will drive the wringer in the reverse direction.

The mechanism hereinbefore described is not only comparatively simple and inexpensive of manufacture but is also reliable and efficient in actual practical operation. Moreover, the parts are all inclosed and incased so that they are protected against the entrance of dirt or water and the operator is protected from injury.

It will be understood that the hub or shaft 50 is a driven shaft with respect to the shaft 17 and the latter is a driving shaft in comparison therewith, although a driven shaft in comparison to the shaft 6. In order to clearly distinguish the shafts 17 and 50 I have in the claims referred to the former as a "driving" shaft and to the latter as a "driven" shaft.

In order to prevent water from the tub passing by the hub 46ª I provide the latter with a packing ring 46ᵇ located in a groove in such hub and pressed firmly in the bearing 47 and thereby arranged to stand still during the rotations of the hub.

As shown in Fig. 14, the shaft 6 of pinion 2 is journaled in a bushing 12ª which is positioned in a hole in the casing 9 and made removable in order to provide for motors of different speeds and for pinions 12 of different size. Each size of pinion has its own bushing and to provide for another size of pinion, another bushing and pinion are substituted. This is an important desideratum due to the fact that as users move from one location to another where electrical current of different phase is used, the proper changes in the machine can be readily and economically made.

I claim:

1. The combination of a rotatable driving shaft, a shaft driven thereby and operating connections between said shafts for reversing the direction of rotation of the driven shaft comprising two opposed driving pinions mounted on the driving shaft, a driven pinion meshing therewith at diametrically opposite points and connected with the driven shaft, a clutch arranged between the driving pinions for operatively connecting one or the other of such pinions with the driving shaft, and mechanism under the control of the driven shaft for governing the movements and position of said clutch, said mechanism comprising a bolt or shaft rotatable with the driven shaft, a member mounted on such bolt to travel longitudinally thereof and to rotate therewith at the ends of its travels, and a connection with the clutch adapted to be contacted by said member when rotated to thereby shift the clutch.

2. The combination of a rotatable driving shaft, a shaft driven thereby and operating connections between said shafts for reversing the direction of rotation of the driven shaft comprising two opposed driving pinions mounted on the driving shaft, a driven pinion meshing therewith at diametrically opposite points and connected with the driven shaft, a clutch arranged between the driving pinions for operatively connecting one or the other of such pinions with the driving shaft, and mechanism under the control of the driven shaft for governing the movements and position of said clutch, said mechanism comprising a bolt or shaft rotatable with the driven shaft, a member mounted on such bolt to travel longitudinally thereof and to rotate therewith at the ends of its travels, and a lever on which the clutch is mounted, said lever being adapted to be contacted by said member when rotated to thereby rock the lever and shift the clutch.

3. The combination of a rotatable driving shaft, a shaft driven thereby and operating connections between said shafts for reversing the direction of rotation of the driven shaft comprising two opposed driving pinions mounted on the driving shaft, a driven pinion meshing therewith at diametrically opposite points and connected with the driven shaft, a clutch arranged between the driving pinions for operatively connecting one or the other of such pinions with the driving shaft, and mechanism under the control of the driven shaft for governing the movements and position of said clutch, said mechanism comprising a screw shaft rotatable with the driven shaft, a nut engaging the screw threads thereof and adapted to travel longitudinally thereon and to rotate therewith at the end of its travels, and a connection with the clutch adapted to be contacted by the nut when rotated to thereby shift the clutch.

4. The combination of a rotatable driving shaft, a shaft driven thereby and operating connections between said shafts for reversing the direction of rotation of the driven shaft comprising two opposed driving pinions mounted on the driving shaft, a driven pinion meshing therewith at diametrically opposite points and connected with the driven shaft, a clutch arranged between the driving pinions for operatively connecting one or the other of such pinions with the driving shaft, and mechanism under the control of the driven shaft for governing the movements and position of said clutch, said mechanism comprising a screw shaft rotatable with the driven shaft, a nut engaging the screw threads thereof and adapted to travel longitudinally thereon and to rotate therewith at the end of its travels, and a connection with the clutch adapted to be contacted by the nut when rotated to thereby shift the clutch, said nut being weighted to assure said longitudinal travel.

5. The combination of a rotatable driving shaft, a shaft driven thereby and operating connections between said shafts for reversing the direction of rotation of the driven shaft comprising two opposed driving pinions mounted on the driving shaft, a driven pinion meshing therewith at diametrically opposite points and connected with the driven shaft, a clutch arranged between the driving pinions for operatively connecting one or the other of such pinions with the driving shaft, and mechanism under the control of the driven shaft for governing the movements and position of said clutch, said mechanism comprising a screw shaft rotatable with the driven shaft, a nut engaging the screw threads thereof and adapted to travel longitudinally thereon and to rotate therewith at the end of its travels, and a connection with the clutch adapted to be contacted by the nut when rotated to thereby shift the clutch, said nut having a depending portion acting as a weight to assure said longitudinal travel.

6. The combination of a rotatable driving shaft, a shaft driven thereby and operating connections between said shafts for reversing the direction of rotation of the driven shaft comprising two opposed driving pinions mounted on the driving shaft, a driven pinion meshing therewith at diametrically opposite points and connected with the driven shaft, a clutch arranged between the driving pinions for operatively connecting one or the other of such pinions with the driving shaft, and mechanism under the control of the driven shaft for governing the movements and position of said clutch, said mechanism comprising a screw shaft rotatable with the driven shaft, a nut engaging the screw threads thereof and adapted to travel longitudinally thereon and to rotate therewith at the end of its travels, means at opposite ends of the screw shaft for engaging and causing rotation of the nut in union with its shaft when the nut approaches the extremes of its travels, and a connection with the clutch adapted to be contacted by the nut when rotated to thereby shift the clutch.

7. The combination of a rotatable driving shaft, a shaft driven thereby and operating connections between said shafts for reversing the direction of rotation of the driven shaft comprising two opposed driving pinions mounted on the driving shaft, a driven pinion meshing therewith at diametrically opposite points and connected with the driven shaft, a clutch arranged between the driving pinions for operatively connecting one or the other of such pinions with the driving shaft, and mechanism under the control of the driven shaft for governing the movements and position of said clutch, said mechanism comprising a screw shaft rotatable with the driven shaft, a nut engaging the screw threads thereof and adapted to travel longitudinally thereon and to rotate therewith at the end of its travels, projections located adjacent the opposite ends of the screw shaft in position to engage the nut at the extremes of its travels and to thereby cause rotation thereof, and a connection with the clutch adapted to be contacted by the nut when rotated to thereby shift the clutch.

8. The combination of a rotatable driving shaft, a shaft driven thereby and operating connections between said shafts for reversing the direction of rotation of the driven shaft comprising two opposed driving pinions mounted on the driving shaft, a driven pinion meshing therewith at diametrically opposite points and connected with the driven shaft, a clutch arranged between the driving pinions for operatingly connecting one or the other of such pinions with the driving shaft, and mechanism under the control of the driven shaft for governing the movements and position of said clutch, said mechanism comprising a screw shaft rotatable with the driven shaft, a nut engaging the screw threads thereof and adapted to travel longitudinally thereon and to rotate therewith at the end of its travels, a projection on the driven pinion in position to engage the nut n one extreme of travel, a projection c. the screw shaft to engage the nut on its other extreme of travel, and a connection with the clutch adapted to be contacted by the nut when rotated to thereby shift the clutch.

9. The combination of a rotatable driving shaft, a shaft driven thereby and operating connections between said shafts for reversing the direction of rotation of the driven shaft comprising two opposed driving pinions mounted on the driving shaft, a driven pinion meshing therewith at diametrically opposite points and connected with the driven shaft, a clutch arranged between the driving pinions for operatively connecting one or the other of such pinions with the driving shaft, and mechanism under the control of the driven shaft for governing the movements and position of said clutch, said mechanism comprising a screw shaft rotatable with the driven shaft, a nut engaging the screw threads thereof and adapted to travel longitudinally thereon and to rotate therewith at the end of its travels, said nut having a depending portion acting as a weight to assure said travel and said portion having projections on opposite sides, projections located adjacent the opposite ends of the screw shaft in position to engage said nut projections at the extremes of the travels of the nut to thereby cause rotation thereof, and a connection with the clutch adapted to be contacted by the nut when rotated to thereby shift the clutch.

10. The combination of a rotatable driving shaft, a shaft driven thereby and operating connections between said shafts for reversing the direction of rotation of the driven shaft comprising two opposed driving pinions mounted on the driving shaft, a driven pinion meshing therewith at diametrically opposite points and connected with the driven shaft, a clutch arranged between the driving pinions for operatively connecting one or the other of such pinions with the driving shaft, and mechanism under the control of the driven shaft for governing the movements and position of said clutch, said mechanism comprising a screw shaft rotatable with the driven shaft, a nut engaging the screw threads thereof and adapted to travel longitudinally thereon and to rotate therewith at the end of its travels, a projection in the driven pinion in position to engage the nut on one extreme of its travels, a collar arranged on the outer end of the screw shaft and having a projection to engage the nut on the other extreme of its travels, and a connection with the clutch adapted to be contacted by the nut when rotated to thereby shift the clutch.

11. The combination of a rotatable driving shaft, a shaft driven thereby and operating connections between said shafts for reversing the direction of rotation of the driven shaft comprising two opposed driving pinions mounted on the driving shaft, a driven pinion meshing therewith at diametrically opposite points and connected with the driven shaft, a clutch arranged between the driving pinions for operatively connecting one or the other of such pinions with the driving shaft, and mechanism under the control of the driven shaft for governing the movements and position of said clutch, said mechanism comprising a screw shaft rotatable with the driven shaft, a nut engaging the screw threads thereof and adapted to travel longitudinally thereon and to rotate therewith at the end of its travels, said screw shaft being secured to the driven pinion at its axis of rotation, means at opposite ends of the screw shaft for engaging the nut and causing its rotation in unison with the shaft when the nut approaches the extremes of its travels, and a connection with the clutch adapted to be contacted by the nut when rotated to thereby shift the clutch.

12. The combination of a rotatable driving shaft, a shaft driven thereby and operating connections between said shafts for reversing the direction of rotation of the driven shaft comprising two opposed driving pinions mounted on the driving shaft, a driven pinion meshing therewith at diametrically opposite points and connected with the driven shaft, a clutch arranged with the driven shaft, a clutch arranged between the driving pinions for operatively connecting one or the other of such pinions with the driving shaft, and mechanism under the control of the driven shaft for governing the movements and position of said clutch, said mechanism comprising a screw shaft rotatable with the driven shaft, a nut engaging the screw threads thereof and adapted to travel longitudinally thereon and to rotate therewith at the end of its travels, projections located adjacent the opposite ends of the screw shaft in position to engage the nut at the extremes of its travels and to thereby cause rotation thereof, and a connection with the clutch adapted to be contacted by the nut when rotated to thereby shift the clutch, said driven pinion being drum-shaped and inclosing said screw shaft and nut.

13. The combination of a rotatable driving shaft, a shaft driven thereby and operating connections between said shafts for reversing the direction of rotation of the driven shaft comprising two opposed driving pinions mounted on the driving shaft, a driven pinion meshing therewith at diametrically opposite points and connected with the driven shaft, a clutch arranged between the driving pinions for operatively connecting one or the other of such pinions with the driving shaft, and mechanism under the control of the driven shaft for governing the movements and position of said clutch, said mechanism comprising a screw shaft rotatable with the driven shaft, a nut engaging the screw threads thereof and adapted to travel longitudinally thereon and to rotate therewith at the end of its travels, means at opposite ends of the screw shaft for engaging and causing rotation of the nut in union with its shaft when the nut approaches the extremes of its travels, and a connection with the clutch adapted to be contacted by the nut when rotated to thereby shift the clutch, said nut having means for cushioning the contact between it and the said connection.

14. The combination of a rotatable driving shaft, a shaft driven thereby and operating connections between said shafts for reversing the direction of rotation of the driven shaft comprising two opposed driving pinions mounted on the driving shaft, a driven pinion meshing therewith at diametrically opposite points and connected with the driven shaft, a clutch arranged between the driving pinions for operatively connecting one or the other of such pinions with the driving shaft, and mechanism under the control of the driven shaft for governing the movements and position of said clutch, said mechanism comprising a screw shaft rotatable with the driven shaft, a nut engaging the screw threads thereof and adapted to travel longitudinally thereon and to rotate therewith at the end of its travels, means at opposite ends of the screw shaft for engaging and causing rotation of the nut in union with its shaft when the nut approaches the extremes of its travels, and a connection with the clutch adapted to be contacted by the nut when rotated to thereby shift the clutch, said nut having springs on opposite sides for cushioning the contact between it and the said connection.

ALVA J. FISHER.

Witnesses:
S. E. HIBBEN,
ROBERT DOBBERMAN.